A. H. POLLEN AND H. F. LANDSTAD.
APPARATUS FOR DETERMINING AND CORRECTING THE COURSE OF AIRCRAFT AND FOR DROPPING BOMBS THEREFROM.
APPLICATION FILED APR. 3, 1919.

1,363,011.

Patented Dec. 21, 1920.
2 SHEETS—SHEET 2.

UNITED STATES PATENT OFFICE.

ARTHUR H. POLLEN, OF LONDON, AND HALVOR F. LANDSTAD, OF YORK, ENGLAND.

APPARATUS FOR DETERMINING AND CORRECTING THE COURSE OF AIRCRAFT AND FOR DROPPING BOMBS THEREFROM.

1,363,011.  Specification of Letters Patent.  Patented Dec. 21, 1920.

Application filed April 3, 1919. Serial No. 287,331.

*To all whom it may concern:*

Be it known that we, ARTHUR HUNGERFORD POLLEN and HALVOR FOLKSTAD LANDSTAD, subjects of the King of Great Britain, residing at 14 Buckingham street, Strand, London, W. C. 2, and Bishophill House, York, Yorkshire, respectively, have invented certain new and useful Improvements in Apparatus for Determining and Correcting the Course of Aircraft and for Dropping Bombs Therefrom, of which the following is a specification.

This invention relates to means for determining the course to be steered by an air craft with reference to a given object, to the end that it may be known at what moment a bomb should be dropped to hit the object, and the invention consists in certain improvements in the mechanism described and claimed in Letters Patent of the United States No. 1,314,429 granted to us on the 26th day of August 1919, which improvements will be fully described in the specification to follow, and the novel parts pointed out in the pendent claims.

Figure 1:
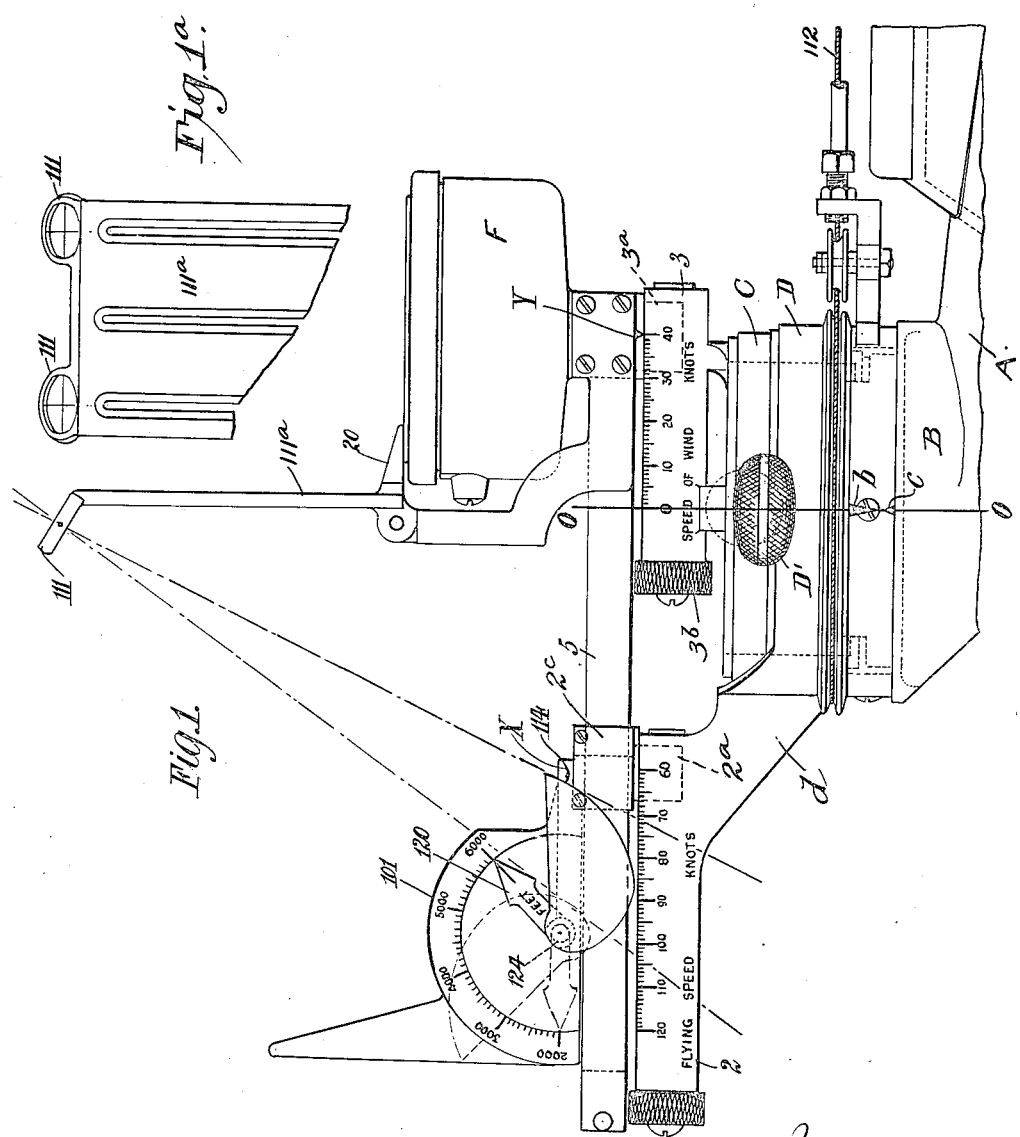

In the accompanying drawings,

Figure 1 is a side elevation of our improved apparatus.

Fig. 1$^a$ is a fragmentary view of a detail of the same.

Figure 2:
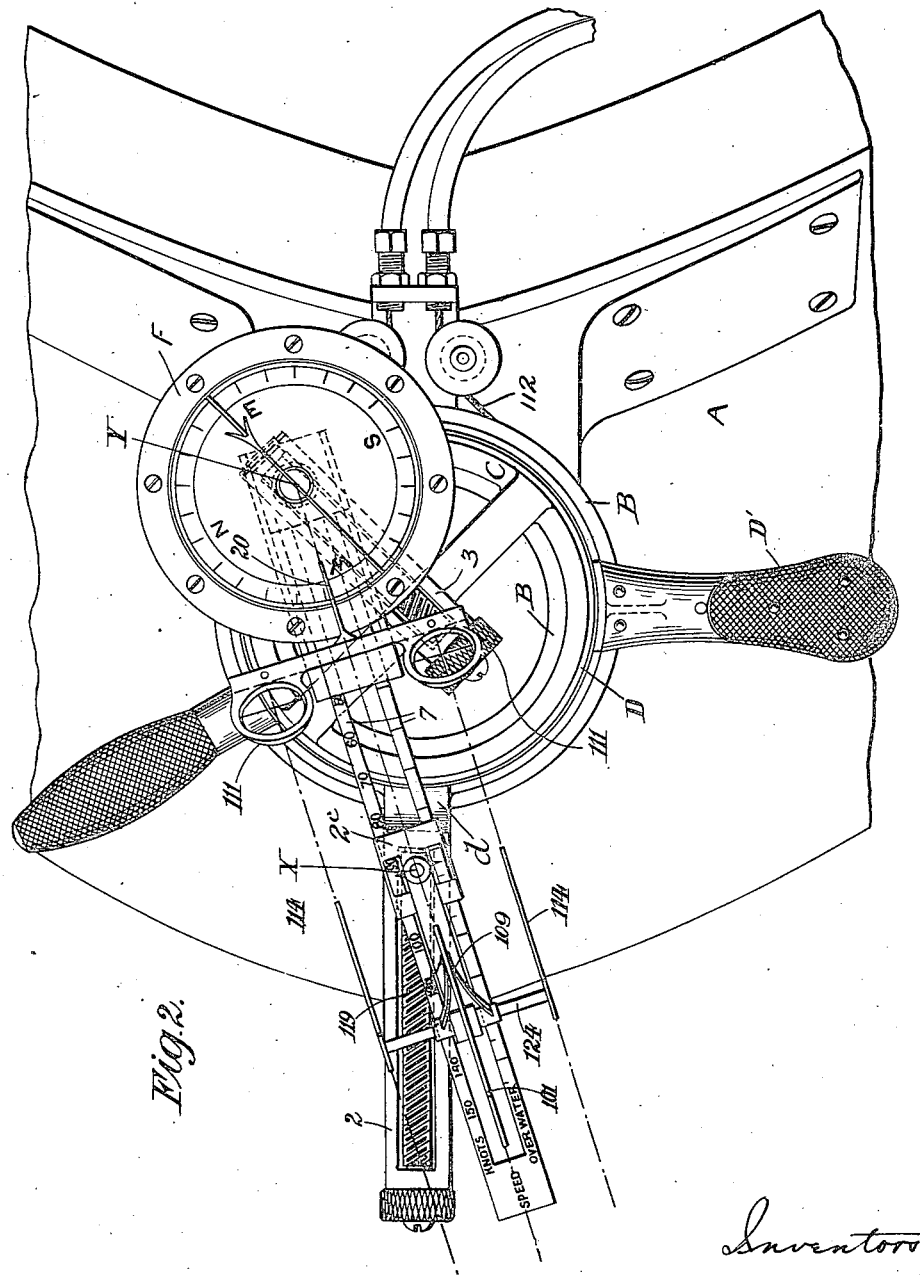

Fig. 2 is a top plan view of the apparatus.

Referring to the drawings,

A represents the framing of an air craft on which is fixedly mounted in front of the observer's seat, a circular supporting standard or pillar B. A ring C loosely surrounds the standard and is supported thereby so that it may be oscillated or turned thereon; and a second ring D surrounds the ring C and is also supported by the standard so that it may be oscillated or turned in relation to the ring C, the said two rings in their movements turning about a central axis O—O. At one side the ring D is provided with a laterally extending bracket arm $d$ terminating in a horizontal arm 2 representing the vector "speed through the air." This arm is graduated in the present instance for knots per hour, and gives support to a slide 2$^a$ provided with a pivot or stud X and operated by a knurled head 2$^b$ so that it can be adjusted along the arm and be set with reference to the graduations thereon to indicate the speed through the air.

The ring C carries a horizontal arm 3 representing the vector "speed and direction of wind," and it extends radially of the ring. The arm is provided with graduations representing the speed of the wind in knots per hour, and it supports a slide 3$^a$ carrying the pivot or stud Y and is operated by the knurled head 3$^b$ to enable it to be adjusted longitudinally of the arm with reference to the graduations to indicate the speed of the wind. From the construction and arrangement of the parts described, it will be understood that the arm 2 rotates about the axis O—O as its origin and carries the pivot Y as its terminus.

5 designates an arm representing the vector "speed overland." At its rear end this arm is journaled on the pivot Y whence it extends forwardly and slidably through a guide 2$^c$ pivoted to the slide 2$^a$ on the pivot X. This arm 5 is suitably provided with a backsight and a foresight of improved form and construction and constitutes in effect a sighting arm; and in the operation of the apparatus the arm is kept sighted on the object in a manner similar to the corresponding arm of our patent above referred to, by altering the direction of the arm 2, which may be conveniently effected by means of a handle D' connected with the ring D and the position of the arm 2 will then give the direction in which the air craft must fly in order to pass over the object, and this direction may be transmitted to an indicator (not shown) in front of the pilot, for instance by means of an endless belt 112 passing around the ring D.

The improved feature of the present invention consists of the special foresight carried by the guide 2$^c$ and consisting of a cam shaped sighting device 114 comprising a pair of cams. The cams are fixed to the ends of a shaft 124 journaled in a horizontal arm 2$^d$ fixed to and extending horizontally forward from the slide 2$^b$. These cams are rotatable with the shaft and thereby adjusted for different altitudes of flight, which altitudes are indicated on a scale 101 extending upwardly from the arm 2$^d$ and are read by means of a pointer 109 fixed to the shaft 124. The contour of the cams is calculated to give the required angular advance of the line of flight for the different altitudes, which of course will vary with the flying speed. But at the speeds for which the apparatus is intended, a fair accuracy is obtainable when this variation is ignored.

A backsight 111 is provided on the upper end of a plate 111ª, and in the operation of the apparatus, the bomb is released when the object to be bombed is seen through the sight openings against the edges of the cams. While in the present instance two cams are provided on the foresight, and two sight openings with cross wires are employed to sight on the two cams, it will be understood that the advantages of our invention can be realized by the employment of a single sighting cam and a single sight opening.

A compass F is fixedly mounted on the arm 5 concentric with the pivot Y, and a pointer 20 carried by the backsight plate 111ª extends parallel to the arm 5 and overlies the compass to enable the operator to use the navigating instrument in dark or foggy weather.

A pointer $b$ is fixed to the ring D, and a pointer $c$ is fixed to the standard or pillar B, which parts are so disposed relatively to each other and to the keel of the air craft, that when the two pointers are in line with each other, the arm 2 will be parallel with the keel.

The speed overland vector 5 is in the present instance divided into knots per hour to correspond with the other vectors, the reading point being at the terminus X. This vector however may be divided in miles per hour, and also in terms of time to cover a certain distance on the ground.

In the use of the apparatus, the slides 3ª and 2ª respectively on the arms 3 and 2, are adjusted according to the known constants "speed of wind," and "speed through the air," and the arm 3 is turned to correspond with the direction of the wind. The arm 2 is then shifted in position to bring the vector 5 to sight on the object, and the arm 2 will then indicate the direction in which the air craft must fly in order to pass over the object, which direction will as before stated be indicated to the pilot and the air craft steered accordingly. The pointer 109 is turned until it points on the scale 101 to the graduation indicating the altitude of the air craft, and this will correspondingly adjust the cams 114 of the foresight. The observer now sights through the sight openings 111, and when the object to be bombed is seen against the edges of the cams, the bomb is released and will hit the object.

In the foregoing description and the accompanying drawings I have set forth my invention in the particular detailed form which I prefer to adopt, but it will be understood that these details may be variously changed without departing from the limits of the invention; and further it will be understood that the invention is not limited to any particular form or construction of the parts except in so far as such limitations are specified in the claims.

Having thus described our invention what we claim and desire to secure by Letters Patent is:

1. In combination with an air craft, means thereon for determining the compass course to be steered with reference to a given object, said means including a movable member adapted to be adjusted according to the known constant "speed through the air," a second movable member adapted to be adjusted according to the known constant "speed of wind and compass direction of wind" and a sighting device pivotally and slidably connected with said members and including a foresight adjustable to indicate the variations in the angle of advance of the line of flight for variations in the altitude of the air craft.

2. In combination with an air craft, means thereon for determining the compass course to be steered with reference to a given object, said means including a movable member adapted to be adjusted according to the known constant "speed through the air," said member being provided with a guide, a second member adapted to be adjusted accordingly to the known constant "speed and direction of wind," a bar pivoted to the second member and sliding through the guide on the first member and indicating the speed overland, a backsight carried by the bar, and a foresight carried by the guide and adjustable to indicate the variations in the angle of advance of the line of flight for variations in the altitude of the air craft.

3. In combination with an air craft, means thereon for determining the compass course to be steered with reference to a given object, said means including an arm rotatable about an axis, movable means on said arm for setting up the known constant "speed through the air," said means being provided with a guide, a second arm rotatable about the axis of the first arm to indicate the direction of the wind, movable means thereon for setting up the known constant "speed of the wind," a bar pivoted to the last mentioned movable means and sliding through the guide, a backsight on the bar, and a foresight carried by the guide and adjustable to indicate the variations in the angle of advance of the line of flight for variations in the altitude in the air craft.

4. In combination with an air craft, means thereon for determining the compass course to be steered with reference to a given object, said means including a mechanism for setting up the known constant "speed through the air," a second mechanism for setting up the known constant "speed and direction of the wind," a bar operatively connected to said mechanisms and adjusted thereby to indicate speed overland, a backsight carried by said bar, and a foresight carried by the first mentioned mechanism, said foresight being adjustable in accordance with the altitude of the air craft.

In testimony whereof we have hereunto set our hands in presence of two subscribing witnesses.

ARTHUR H. POLLEN.
HALVOR F. LANDSTAD.

Witnesses:
 NEVILLE E. BROOKES,
 E. C. WALKER.